(12) United States Patent
Tulino et al.

(10) Patent No.: US 10,097,602 B2
(45) Date of Patent: Oct. 9, 2018

(54) CHANNEL-AWARE CACHING-AIDED CODED MULTICAST

(71) Applicant: Alcatel-Lucent USA Inc., Murray Hill, NJ (US)

(72) Inventors: Antonia Maria Tulino, Lincroft, NJ (US); Jaime Llorca, Red Bank, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 260 days.

(21) Appl. No.: 15/083,500

(22) Filed: Mar. 29, 2016

(65) Prior Publication Data

US 2017/0289218 A1    Oct. 5, 2017

(51) Int. Cl.
    *G06F 13/00*    (2006.01)
    *H04L 29/06*    (2006.01)
    *H04L 29/08*    (2006.01)
    *H04W 4/06*     (2009.01)

(52) U.S. Cl.
    CPC ...... *H04L 65/4084* (2013.01); *H04L 65/4076* (2013.01); *H04L 65/602* (2013.01); *H04L 67/2842* (2013.01); *H04W 4/06* (2013.01)

(58) Field of Classification Search
    CPC ............. H04L 65/4084; H04L 65/4076; H04L 65/602; H04L 67/2842; H04W 4/06
    USPC ................. 709/231, 246, 245, 230, 232–236
    See application file for complete search history.

(56) References Cited

U.S. PATENT DOCUMENTS

| 9,503,525 | B2 * | 11/2016 | Tulino | H04L 67/1097 |
| 9,509,774 | B2 * | 11/2016 | Tulino | H04L 67/1097 |
| 9,578,099 | B2 * | 2/2017 | Llorca | H04L 67/1097 |
| 9,686,358 | B2 * | 6/2017 | Tulino | H04L 67/1097 |
| 2015/0207881 | A1 | 7/2015 | Tulino et al. | |
| 2015/0207895 | A1 | 7/2015 | Tulino et al. | |
| 2015/0207896 | A1 | 7/2015 | Llorca et al. | |
| 2015/0207903 | A1 | 7/2015 | Tulino et al. | |

OTHER PUBLICATIONS

Cisco Visual Networking Index: "Forecast and Methodology, 2013-2018", Cisco, Jun. 2014—14 pages.

(Continued)

*Primary Examiner* — Kenneth R Coulter
(74) *Attorney, Agent, or Firm* — Nokia Technologies Oy

(57) ABSTRACT

In one aspect, a network element for a wireless Content Delivery Network is provided. The network element receives requests from receiver devices for a video segment over the wireless CDN, and computes a number of descriptors (representing quality) of the requested video segment, where the number of descriptors is determined for each receiver device based on channel conditions between the network element and the receiver devices. The network element clusters a set of descriptors for each receiver device into a minimum number of Generalized Independent Sets (GISs) based on the computed number of descriptors and the channel conditions between the network element and the receiver devices, and generates a multicast codeword encoding the clustered descriptors for each receiver device using the minimum number of GISs. The network element transmits the multicast codeword to each of the receiver devices in response to the received requests.

20 Claims, 7 Drawing Sheets

(56) References Cited

OTHER PUBLICATIONS

Cisco Visual Networking Index: "Global Mobile Data Traffic Forecast, 2014-2019.", Cisco Feb. 2015—83 pages.

N. Golrezaei et al, "Femtocaching and Device-to-Device Collaboration: A New Architecture for Wireless Video Distribution,"IEEE Communications Magazine, vol. 51, No. 4—8 pages, Apr. 2013.

M. Maddah-Ali et al, "Fundamental limits of caching" (online) Available: http://arxiv.org/abs/1209.5807—19 pages.

M. Maddah-Ali et al, "Decentralized coded caching attains order-optimal memory-rate tradeoff," Networking, IEEE/ACM Transactions on, vol. PP, No. 99, 1-1, 2014—12 pages.

M. Ji et al, "On the average performance of caching and coded multicasting with random demands," in Wirelesss Communications Systems (ISWCS), 2014, 11th International Symposium on, IEEE, 2014—5 pages.

M. Ji et al, "Order-optimal rate of caching and coded multicasting with random demands," arXiv; 1502,03124, 2015—94 pages.

M. Ji et al, Caching and coded multicasting: Multiple groupcast index coding:, in IEEE Global Conference on Signal and Information Processing (GlobalSIP), Dec. 2014, 5 pages.

M. Ji, et al, "An efficient multiple-groupcast coded multicasting scheme for finite fractional caching," in To appear in ICC, IEEE, 2015—6 pages.

G. Vettigli, et al, "An efficient coded multicasting scheme preserving the multiplicative caching gain," in To appear in INFOCOM Workshop, IEEE 2015—6 pages.

K. Shanmugam et al, "Finite length analysis of caching-aided coded multicasting," in Annual Allerton Conference on Communication, Control and Computing, 2014 Proceedings, Oct. 2014—8 pages.

P. A. Chou et al, "Layered multiple description coding," in Packet Video Workshop, Apr. 2003—7 pages.

S. Pudlewski et al,"Video Transmission Over Lossy Wireless Networks: A Cross-Layer Perspective, "IEEE Journal of Selected Topics in Signal Processing, vol. 9, No. 1, Feb. 2015—16 pages.

S. Kokalj-Filipovic et al, "Cliff effect suppression through multiple-descriptions with split personality," in Information Theory Proceedings (ISIT), 2011 IEEE International Symposium on, Jul. 2011, 5 pages.

S.Albers et al, "Average case analyses of list update algorithms, with applications to data compression," 1998—18 pages.

Z. Bar-Yossef et al, "Index coding with side information," Information Theory, IEEE Transactions on, vol. 57, No. 3—16 pages.

S. Boucheron et al, Concentration Inequalitites : A Nonasymptotic Theory of Independence, Oxford University Press, 2013—33 pages.

\* cited by examiner

```
Algorithm 2 CA-HgC₂
```
1: $\mathcal{A} = \emptyset$
2: $X = \emptyset$
3: for $i = U : 1$ do
4:     for $v \in H_i : |\mathcal{K}_v| = \min_{v' \in H_i}\{|\mathcal{K}_{v'}|\}$ do
5:         $[\mathcal{G}, \Omega]$ =GISfunction($H_i, v, i$)
6:         if $\mathcal{G} = \emptyset$ then
7:             $\forall u \in \Omega$ code the vertices in $\{v' \in \mathcal{G} : \mu(v') = u\}$ with the $\left(\frac{\Delta}{\mathbb{E}[\psi(\Gamma,M)]}\right)$-length codeword $c_u = \mathbb{C}_u(\{v' \in \mathcal{G} : \mu(v') = u\})$ in the codebook $\mathbb{C}_u$
8:             $X = [X \sum_{u \in \Omega} \otimes c_u]$
9:             color $\left(\sum_{u \in \Omega} \otimes c_u\right]$ by $\alpha \notin \mathcal{A}$
10:           $H_i = H_i \setminus \mathcal{G}$
11:         else
12:           $H_i = H_i \setminus \{v\}$; $H_{i-1} = H_{i-1} \cup \{v\}$
13:         end if
14:     end for
15: end for
16: return $|\mathcal{A}|$, X

*FIG. 8*

Algorithm 3 GISfunction($H_i$, $v$, $i$)

1: $\mathcal{G} = \{v\}$; $\Omega = \{\mu(v)\}$; $\tilde{H}_i = H_i$
2: for $v' \in \tilde{H}_i \backslash \mathcal{G} : |\mathcal{K}_{v'}| = \min_{v'' \in \tilde{H}_i \backslash \mathcal{G}} \{\|\mathcal{K}_{v''}\|\}$ do
3:   if no edge between $v'$ and $\mathcal{G}$ then
4:     $\mathcal{G} = \mathcal{G} \cup \{v'\}$; $\Omega = \Omega \cup \{\mu(v')\}$
5:   else
6:     $\tilde{H}_i = \tilde{H}_i \backslash \{v'\}$
7:   end if
8: end for
9: if $|\mathcal{G}| \geq i$ then
10:   for $v' \in \tilde{H}_i \backslash \mathcal{G} : |\mathcal{K}_{v'}| = \min_{v'' \in \tilde{H}_i \backslash \mathcal{G}} \{\|\mathcal{K}_{v''}\|\} \wedge \mu(v') \in \Omega$ do
11:     $\mathcal{G}_{\mu(v')} = \{v'' \in \mathcal{G} : \mu(v'') = \mu(v')\}$
12:     if $|\mathcal{G}_{\mu(v')}| < d_{\mu(v')}$ and no edge between $v'$ and $\mathcal{G} \backslash \mathcal{G}_{\mu(v')}$ then
13:       $\mathcal{G} = \mathcal{G} \cup \{v'\}$
14:     else
15:       $\tilde{H}_i = \tilde{H}_i \backslash \{v'\}$
16:     end if
17:   end for
18:   if $|\mathcal{G}| = \sum_{u \in \Omega} s_u \vee i = 1$ then
19:     return $\mathcal{G}$, $\Omega$
20:   else
21:     return $\mathcal{G} = \emptyset$, $\Omega = \emptyset$
22:   end if
23: else
24:   return $\mathcal{G} = \emptyset$, $\Omega = \emptyset$
25: end if

CHANNEL-AWARE CACHING-AIDED CODED MULTICAST

CROSS-REFERENCE TO RELATED APPLICATIONS

This application is related to commonly assigned, co-pending U.S. application Ser. No. 14/514,938 filed Oct. 15, 2014, and also to commonly assigned, co-pending U.S. application Ser. No. 14/514,905 filed Oct. 15, 2014 the entire contents of both of which are incorporated herein by reference.

BACKGROUND

Content distribution networks (CDNs) face capacity and efficiency issues associated with the increase in popularity of on-demand audio/video streaming. Future Internet usage is expected to include a rich variety of online multimedia services accessed from an ever growing number of multimedia capable mobile devices. As such, CDN providers are challenged to provide solutions that can deliver bandwidth-intensive, delay-sensitive, on-demand video-based services over increasingly crowded, bandwidth-limited wireless access networks. One major cause for the bandwidth stress facing wireless network operators is the difficulty to exploit the multicast nature of the wireless medium when wireless users or access points do not experience the same channel conditions or access the same content at the same time.

BRIEF SUMMARY

In one embodiment a network element (sender) for a wireless Content Delivery Network is provided that is configured to receive a request from receiver devices for a video segment over the wireless CDN. The network element computes a number of descriptors of the video segment scheduled to be delivered to each receiver device, where the number of descriptors is determined for each receiver device based on channel conditions between the network element and the respective receiver devices. The network element clusters a set of descriptors for each receiver device into a minimum number of Generalized Independent Sets (GISs) based on the computed number of descriptors and the channel conditions between the network element and the receiver devices, and generates a multicast codeword encoding the clustered descriptors for each receiver device using the minimum number of GISs. The generated multicast codeword is transmitted from the network element to each of the receiver devices in response to the received request.

In one embodiment the network element determines the clustered set of descriptors scheduled for each receiver device and the minimum number of Generalized Independent Sets (GISs) based on cached content at each of the receivers.

In one embodiment the network element generates the multicast codeword such that each receiver device is enabled to decode its requested video segment at a rate that is equal to the maximum rate achievable based on the channel conditions.

In one embodiment the network element generates the multicast codeword as a fixed length codeword.

In one embodiment the network element clusters the set of descriptors scheduled for each receiver device into a minimum number of Generalized Independent Sets (GISs) such that descriptors in a given GIS that are scheduled for different receiver devices can be transmitted in a same time-frequency slot without affecting decodability of the multicast codeword at the receiver devices.

In one embodiment the network element determines the minimum number of Generalized Independent Sets (GISs) as a determined channel-aware chromatic-number of GISs that cover a conflict graph.

In one embodiment the network element encodes the clustered descriptors scheduled for each receiver device into fixed-length channel codewords for each receiver based on channel conditions between the network element and each receiver device and combines the fixed-length channel codewords into the multicast codeword.

In one embodiment the network element determines the fixed-length channel codewords for each receiver device using a channel codebook that is determined based on the channel conditions between the network element and each receiver device.

In one embodiment the network element transmits the channel codebook to each of receiver devices.

In one embodiment the network element generates the multicast codeword encoding the clustered descriptors for each receiver device using the minimum number of GISs determined via a Channel-Aware Chromatic Index Coding (CA-CIC) algorithm.

In one embodiment the network element generates the multicast codeword encoding the clustered descriptors for each receiver device using the minimum number of GISs determined via a Channel-Aware Hierarchical greedy Coloring (CA-HgC) algorithm.

BRIEF DESCRIPTION OF THE DRAWINGS

FIG. 7 is an example of an algorithm in accordance with an aspect of the disclosure.

FIG. 8 is an example of another algorithm in accordance with an aspect of the disclosure.

DETAILED DESCRIPTION

Figure 1:
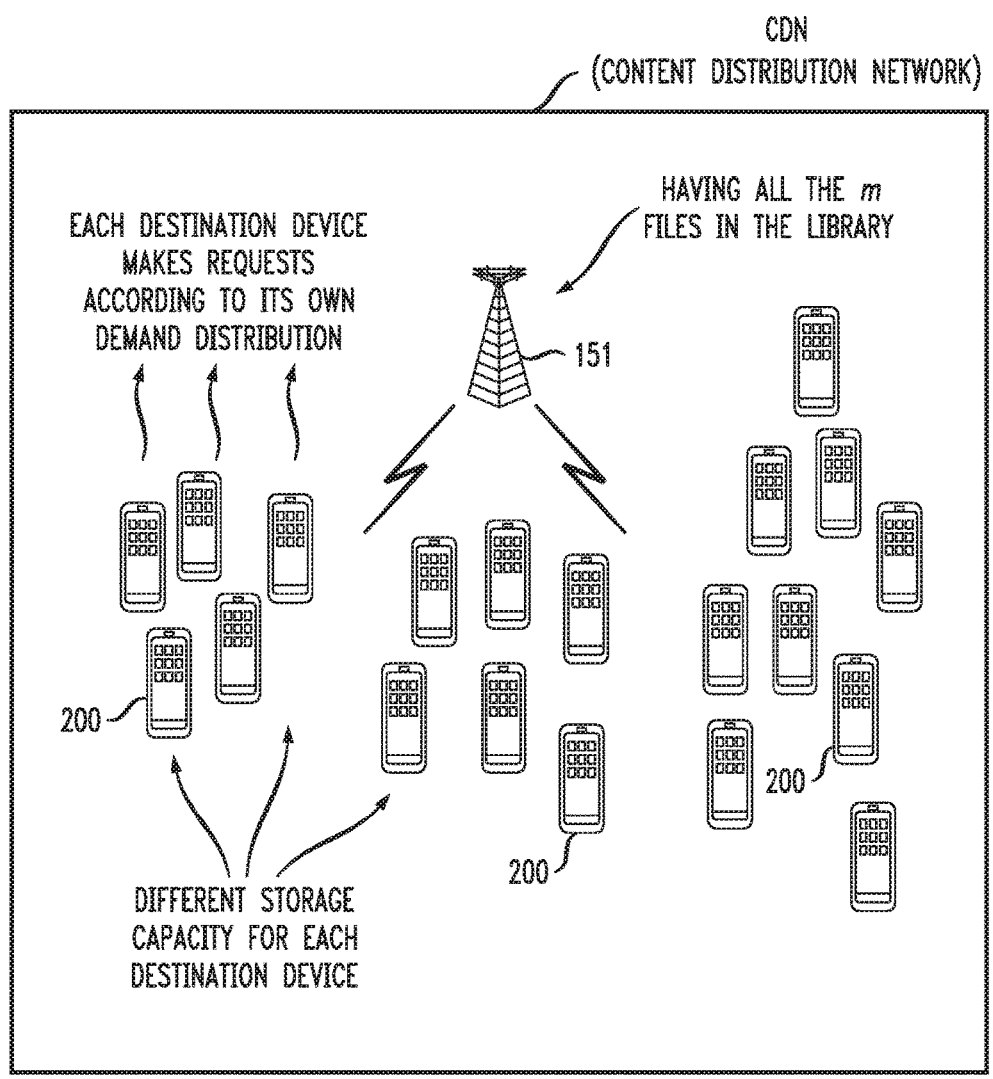
FIG. 1 illustrates an example embodiment of a content distribution network.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The present disclosure is directed towards a wireless video delivery paradigm based on the use of channel-aware caching and coded multicasting that allows simultaneously serving multiple cache-enabled access points that may be requesting different content and experiencing different channel conditions. The present disclosure addresses the caching-aided coded multicast problem as a joint source-channel coding problem and describes a framework that preserves the cache-enabled multiplicative throughput gains of the error-free scenario, while ensuring independent maximum per-receiver (access point) channel rates, unaffected by the presence of receivers with worse channel conditions.

Some of the notable aspects of the present disclosure described in detail below include 1) an information theoretic framework for wireless video distribution that takes into account the specific characteristics of the wireless propagation channel (i.e., channel rates) in the presence of any combination of unicast/multicast transmission and wireless edge caching. 2) A channel-aware caching-aided coded multicast video delivery scheme, referred to herein as Random Popularity based caching and Channel-Aware Chromatic-number Index Coding (RAP-CA-CIC), which provides for the highest admissible video throughput to each receiver (helper) for the given propagation conditions, i.e., avoiding throughput penalizations from the presence of receivers experiencing worse propagation conditions. 3) A novel polynomial-time approximation of RAP-CA-CIC, referred to as Random Popularity based caching and Hierarchical greedy Channel Aware Coloring (RAP-CA-HgC) with running time at most cubic in the number of receivers and quadratic in the number of (per-receiver) requested video descriptions.

As shown in FIG. 1, a Content Distribution Network (CDN) in accordance with various aspects of the disclosure may include a network element 151 ("sender node") wirelessly connected to a plurality U of destination or receiver nodes 200 ("helper devices"), where $\cup = \{1, \ldots, U\}$. The network element 151 may be a content source (e.g., a multicast source base station) for distributing data files (e.g., movie files). The destination devices 200 may be cache-enabled small cell base stations, access points, or end user devices requesting data from the content source. Each destination or receiver device 200 may be part of or associated with a device that allows for an end user to access the requested data. For example, each destination device 200 may be an access point, a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

The wireless links interconnecting the network element 151 to the receiver nodes 200 are assumed to be lossy links. Specifically, the lossy links between the sender and the receivers are assumed to be stochastically degraded binary broadcast channels (BC). While the binary field is particularly convenient for ease of presentation, the present disclosure is not limited to any particular model and can be extended to general stochastically degraded broadcast channels, with the case of arbitrary additive noise broadcast channels being particularly immediate. The channel noise analysis includes both a binary symmetric broadcast channel (BS-BC) and a binary erasure broadcast channel (BE-BC).

BS-BC Case:

The channel output $Y_u[t]$ observed by the u-th receiver at the t-th channel use takes values in the binary alphabet $Y \equiv \{0,1\}$ and is given by $$Y_u[t] = X[t] + Z_u[t],$$

where $X[t]$ denotes the binary encoded symbol sent by the sender at the t-th channel use, and $Z_u[t]$ denotes the additive noise of the channel corresponding to receiver u, modeled as a Bernoullian variable with parameter given by the channel degradation $\varepsilon_u$, i.e., $Z[t]:B(\varepsilon_u)$. Denoting the achievable channel rate as and denoting $H(\varepsilon_u)$ as the binary entropy function the relationship may be defined as: $\eta_u \leq 1 - H(\varepsilon_u)$.

BE-BC Case:

The channel output $Y_u[t]$ observed by the u-th receiver at the t-th channel use exactly reproduces the channel input $X[t]$ with probability $(1-\varepsilon_u)$ and otherwise indicates an erasure event, with probability $\varepsilon_u$. In this case, $Y_u[t]$ takes values in the binary alphabet $Y \equiv \{0,1,å\}$ so that an erasure event is represented by the erasure symbol "å". The achievable channel rate $\eta_u$ then satisfies $\eta_u \leq 1 - \varepsilon_u$. Without loss of generality, it is assumed that $0 \leq \varepsilon_1 \leq \varepsilon_2 \leq \ldots \leq \varepsilon_U \leq 1$.

Figure 2:
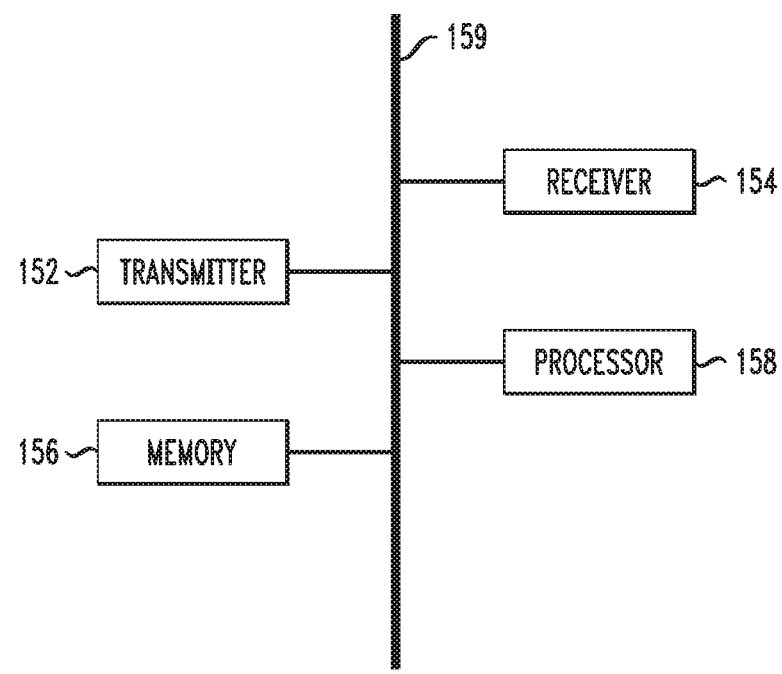
FIG. 2 illustrates an example structure of a network element.

FIG. 2 is a diagram illustrating an example structure of network element 151. According to at least one example embodiment, the network element 151 may be configured for use in a communications network (e.g., the content distribution network (CDN) of FIG. 1). As shown in the example of FIG. 2, the network element 151 may include a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

It should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

The present disclosure is described, without limitation, in the context of a video streaming application. It is accordingly assumed that the sender has access to a content library $F = \{1, \ldots, m\}$ containing m files, where each file has entropy equal to F bits. Each receiver $u \in U$ has a cache with storage capacity $M_u F$ bits (i.e., $M_u$ files). $M_{u,f}$ denotes the fraction of file $f \in F$ stored (cached) at receiver u, such that $\Sigma_f M_{u,f} \leq M_u$. Without loss of generality, the files are represented by binary vectors $W_f \in 2^F$.

Each file $f \in F$ represents a video segment, which is multiple description coded into D descriptions using, for example, one of conventional coding schemes. Each description is packaged into one information unit or packet for transmission. Each packet is represented as a binary vector of length (entropy) $B = F/D$ bits. A low-quality version of the content can be reconstructed once a receiver is able to recover any description. The reconstruction quality improves by recovering additional descriptions and depends solely on the number of descriptions recovered, irrespective of the particular recovered collection. Hence, there are D video qualities per segment, where the entropy in bits of quality $d \in \{1, \ldots, D\}$, containing d descriptions, is given by $F_d = Bd$. Note that in video streaming applications, each video segment typically has the same (playback) duration, which is denoted by $\Delta$ in time units (or channel uses) herein. Hence, the difference in quality levels solely depend on the number of bits $F_d$.

Video segments are characterized by a popularity or demand distribution $Q = [q_{f,u}]$, $u = 1, \ldots, U$, $f = 1, \ldots, m$, where $q_{f,u} \in [0,1]$ and $\Sigma_{f=1}^{m} q_{f,u} = 1$ (e.g., receiver u requests file f with probability $q_{f,u}$). Without loss of generality up to index reordering, is is assumed $q_{f,u}$ has non-increasing components $q_{1,u} \geq \ldots \geq q_{m,u}$. Let $f_u$ denote the random request at receiver u. The realization of $f_u$ is denoted by $f_u$.

It is noted that the present disclosure is directed to a general video on-demand setting, in which receiver requests follow an arbitrary popularity distribution. As such, the demand message set cannot be represented as a degraded message set since a given receiver's demand is not necessarily a subset of another receiver's demand. The present disclosure includes and generalizes any combination of degraded message sets, via possible overlapping of receiver demands, and message cognition, via available cached or side information.

Various aspects are described in which the sender (e.g., network element 151) implements a video delivery system to receivers 200 in two phases: a caching (or placement) phase followed by a transmission (or delivery) phase. Prior to describing various aspects pertaining to the operations of the sender device in the transmission or delivery phase (the primary focus of the present disclosure), an overview of the operations of the sender device during the caching phase is described first for completeness.

Caching Phase

The caching phase occurs during a period of low network traffic. In this phase, using the knowledge of the demand distribution and the cache capacity constraints, the sender decides what content to (transmit and) store at each receiver. Because of the time-scale separation between caching and transmission phases, the caching phase is sometimes referred to as the placement or pre-fetching phase.

In one aspect, the sender may be configured to implement the caching phase using Algorithm 1 below, where each data file 'f' that belongs to the library 'F' is divided into 'B' equal-size packets, represented as symbols of a finite field:

---
Algorithm 1: Caching algorithm
---
1 for f ∈ F →
2   Each user u caches a subset of
    $p_{u,f}M_uB$ distinct packets of file f
    uniformly at random;
3 endfor
4 M = {$M_{u,f}$ with u = 1,...,n, and f = 1,...,m};
5 return(M);
end Caching algorithm
---

During the caching phase, the network element 151 exploits the fact that a video segment is multiple description coded into D descriptions, each of length B=F/D bits. In the following, such descriptions are referred to as packets and denoted by $\{W_{f,i}: i=1, \ldots, D\}$. At the beginning of time, a realization of the library $\{W_f\}$ is revealed to the sender. The sender fills the caches of each of the U receivers through a set of U encoding functions $\{Z_u\}$, such that $Z_u(\{W_f\})$ denotes the codeword stored in the cache of receiver u.

Thus, caching phase as implemented by the network element works as follows. Each receiver, instructed by the sender, randomly selects and stores in its cache a collection of $p_{f,u}M_uD$ distinct packets of file f∈F received from the sender, where $p_u = (p_{1,u}, \ldots, p_{m,u})$ is a vector with components $0 \leq p_{f,u} \leq 1/M_u$, ∀f, such that $\Sigma_{f=1}^m p_{f,u} = 1$, referred to as the caching distribution of receiver u. Hence, the arbitrary element $p_{f,u}$ of $p_u$ represents the fraction of the memory $M_u$ allocated to file f. The resulting codeword $Z_u(\{W_f\})$ transmitted by the sender and stored in the cache of receiver u is given by:

$$Z_u = \left(W_{1,l^u_{1,1}}, \ldots, W_{1,l^u_{1,p_{1,u}M_uD}}, W_{2,l^u_{2,1}}, \ldots, \right.$$
$$\left. W_{2,l^u_{1,p_{2,u}M_uD}}, \ldots, W_{m,l^u_{m,1}}, \ldots, W_{m,l^u_{m,p_{m,u}M_uD}}\right)$$

Where, $1_{f,i}^u$ is the index of the i-th packet of file f cached by receiver u. The tuples of indices $(1^u_{f,1}, \ldots, 1^u_{f,p_{f,u}M_uD})$ are chosen independently across for each receiver u∈U and file f∈F, with uniform probability over all $$\binom{D}{p_{f,u}M_uD}$$

distinct subsets of size $p_{f,u}M_uD$ in the set of D packets of file f. The random collection of cached packet indices across all receivers are referred to as the cache configuration, denoted by ={$Z_u$}. A given realization of M the cached information is denoted by M.

Moreover, $M_{u,f}$ denotes the vector of indices of the packets of file f cached by receiver u. The caching policy described above is referred to as RAndom fractional Popularity-based (RAP) caching, which is completely characterized by the caching distribution P={$p_u$}, and is illustrated as Algorithm 1 implemented by the network element 151.

A notable property of RAP as described above of choosing the identity of the packets to be cached uniformly at random is that it increases the number of distinct packets cached across the network. That the receivers 200 thus cache different packets of the same file results in higher efficiencies in terms of coded multicast opportunities during the transmission phase that are described below. This is one of the reasons why multiple description coding may be considered more suitable than scalable video coding, since randomly cached packets (descriptions) can then be used for decoding higher quality video versions. In contrast, with scalable video coding, randomly cached descriptions may be wasted if not all previous descriptions are delivered during the transmission phase. While such wastage could be avoided by only caching descriptions up to the maximum number that can be delivered to a given receiver, this is not a good solution because it creates another problem that there is too much overlap in cached information, which in turn reduces coded multicast opportunities during the delivery phase. In addition, any deviation due to imperfect knowledge of demand and channel conditions can again lead to wasted cached information, reducing system robustness.

Transmission Phase

After the caching phase, and in the transmission (or delivery) phase (the primary focus of the present disclosure), the network is repeatedly used in a time slotted fashion with time-slot duration Δ time units, given by the video streaming application. It is assumed that each receiver requests one video segment per time-slot from the sender. Based on the receiver requests, the stored contents at the receiver caches, and the channel conditions, the sender decides at what quality level to send the requested files (i.e., how many descriptions to send to each receiver), encodes the chosen video segments into a codeword, and sends it over the broadcast channel to the receivers, such that every receiver decodes the requested segment (at the corresponding quality level) within Δ time units. The scheduled quality level for receiver u is denoted by $d_u$.

Thus, given the video segment playback duration Δ, the sender during the transmission or delivery phase is configured to use the knowledge about the cache contents $\{Z_u\}$ that are already cached at the receivers 200, the channel conditions $\{\varepsilon_u\}$ between the sender and the respective receivers 200, and the receiver requests f, schedules the appropriate quality level $d_u$ for each requested video segment through a multicast encoder. The multicast encoder is implemented using a variable-to-fixed encoding function where X denotes the transmitted codeword as:

$$X = X(\{Z_u\}, \{\varepsilon_u\}, f).$$

Here, X is a binary sequences of finite length Δ, f=[$f_1, f_2, \ldots, f_U$], with $f_j \in F$, denotes realization of the receiver random request vector f=[$f_1, f_2, \ldots, f_U$].

Figure 3:
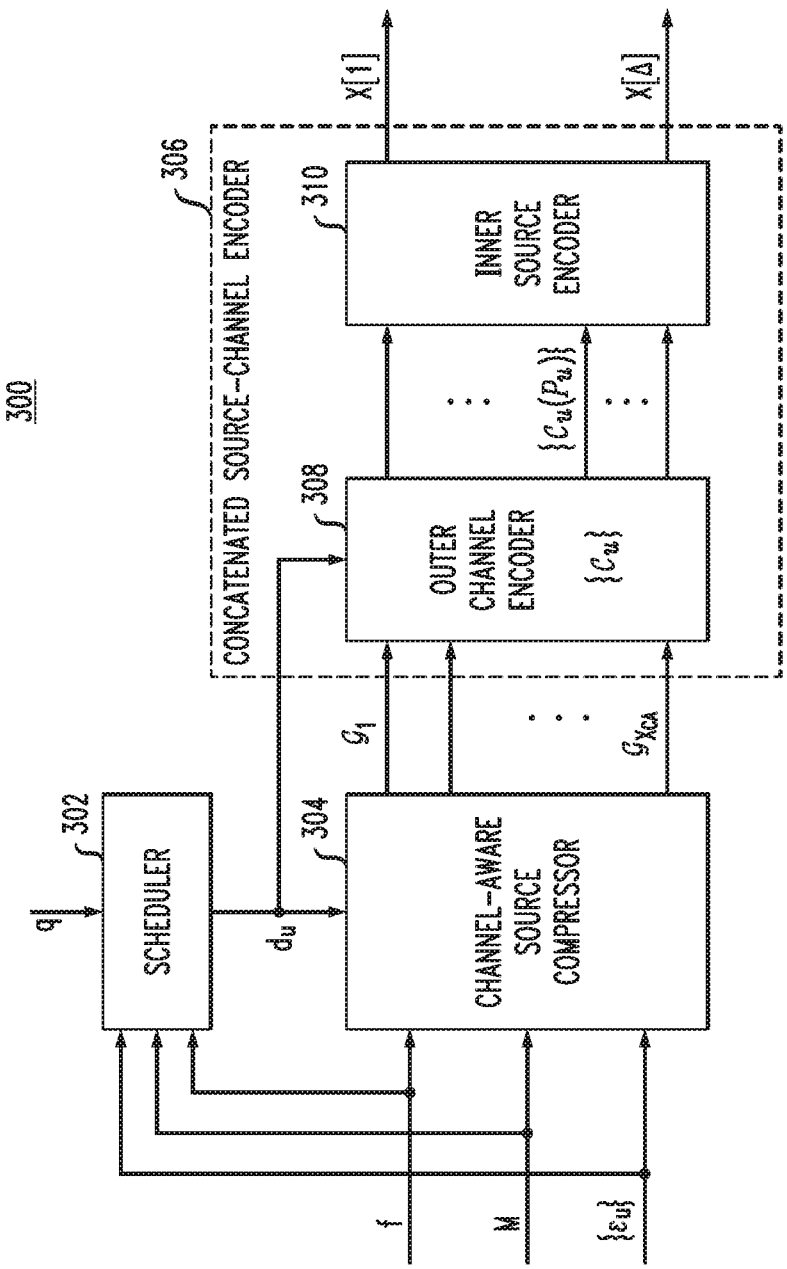
FIG. 3 illustrates a block diagram representation of components of the network element during the delivery phase.

FIG. 3 illustrates a block diagram example of a joint source-channel multicast encoder 300 (or multicast encoder 300) of the network element 151 for implementing the delivery phase. The goal of the multicast encoder 300 is to create a coded multicast codeword that allows each receiver 200 to decode its requested video segment at a rate that is equal to the maximum rate achievable if the remaining U−1 receivers had its same channel degradation. Referring to FIG. 3, the multicast encoder 300 of the network element 151 may include, for example, a scheduler 302, a channel-aware source compressor 304, and a concatenated source-channel encoder 306. The concatenated source-channel encoder may further include an outer channel encoder 308, and an inner source encoder 310. Although a particular set of components is illustrated, it will be understood that in various embodiments the blocks shown in FIG. 3 may be represented by a fewer or greater number of components without departing from the principles of the disclosure.

Figure 4:
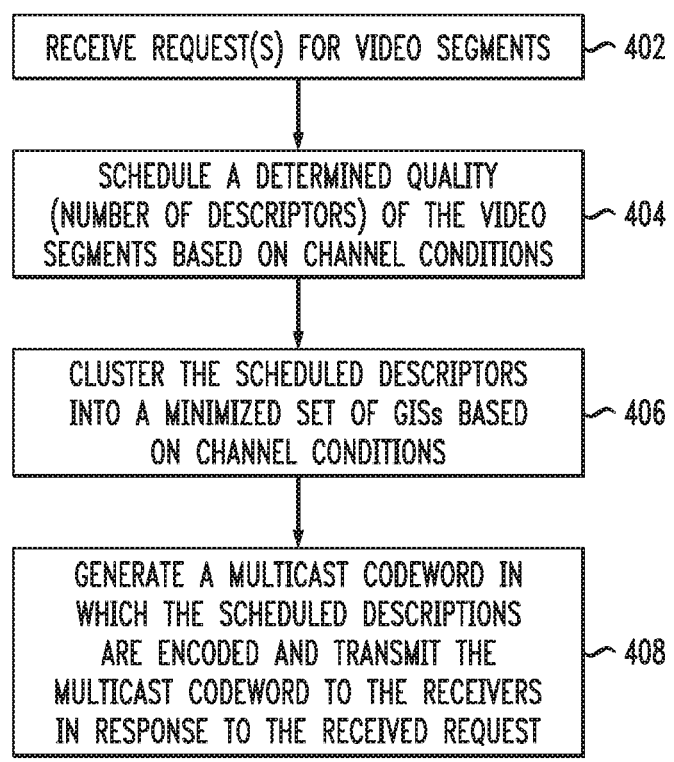
FIG. 4 illustrates an example process flow diagram describing the operation of the delivery phase as implemented by the components of FIG. 3.

The operations each of the blocks illustrated in block diagram 300 of FIG. 3 are described in conjunction with the process flow diagram 400 of FIG. 4.

In step 402, the network element 151 receives a request for a video segment from receivers 200 during the delivery phase. Since the network element 151 has already performed the caching method described above, each destination device 200 may be assumed to have requested only those packets that were not cached (or stored) as a result of the caching method. Thus, the delivery phase consists of providing to each destination device 200 the missing part(s) of the requested files, i.e., the packets missing from that receiver devices' 200 memory.

In step 404, in response to receiving the requests from the receivers 200, the network element 151 (e.g., scheduler 302) computes the quality (i.e., the number of descriptors for the requested video segment) of the packets to be delivered to the receivers in response to the requests (step 404) based on the channel conditions between the sender and the respective receivers. Since for a given realization of the packet-level cache configuration and the channel rates $\{\eta_u\}$, the joint source-channel multicast encoder 300 is a variable-to-fixed encoder that, at each realization of the request vector f, encodes the scheduled descriptions for each receiver $\{d_u\}$ into a multicast codeword X of fixed length $\Delta$, in this step the scheduler 302 is configured to compute the number of descriptions (which represent quality as described above) scheduled for each requesting receiver u as:

$$d_u(f) = \frac{\Delta \eta_u}{B\psi(f, M)},$$

where $\psi(f,M)$ is a function of the packet-level cache realization M and of the request vector realization f, whose expression is given by:

$$\psi(f, M) = \Sigma_{l=1}^{U} \binom{U}{l} \max_{f_u \in f(U^l)} \lambda(f, l),$$

and, $\lambda(f, l) = (p_f M)^{l-1}(1 - p_f M)^{U-l+1}$.

The above computation of $d_u(f)$ by scheduler 302 ensures that, for a codeword of length $\Delta$, receiver u obtains $d_u$ descriptions (each of size B) at a rate $\eta_u/\psi(f,M)$, which is the maximum achievable rate when the remaining U−1 receivers have the same channel degradation $\eta_u$.

In step 406, the network element 151 (e.g., channel aware source compressor 304) then clusters the set of packets (descriptions) scheduled for each receiver $\{d_u\}$ into a determined minimized set of equivalent classes, each of which are referred to herein as the generalized independent set (GIS), which function is implemented by the channel-aware source compressor 304. In particular, the channel-aware source compressor 304 clusters the entire set of scheduled packets (descriptions) into the minimum number of GISs satisfying the following conditions: First, any two packets in a GIS scheduled for different receivers can be transmitted in the same time-frequency slot without affecting decodability; and second, the set of packets in a GIS scheduled for receiver u, denoted by $P_u$, satisfies:

$$\frac{|P_u|}{\eta_u} = \frac{|P_i|}{\eta_i}, \forall u, i \in \{1, \ldots, U\},$$

to ensure that each receiver is scheduled a number of packets (descriptions) proportional to its channel rate (i.e., based on the channel conditions).

As described further below this minimization corresponds to a NP-hard optimization problem related to finding the minimum number of GISs that cover a properly constructed conflict graph. The minimum number of GISs that are determined by the channel-aware source compressor 304 to cover the conflict graph is referenced herein as the channel-aware chromatic-number, $\chi_{CA}$, which are then transmitted, to the receivers using one of two associated transmission schemes that are fully described, with examples, in the sections below.

In step 408, the network element 151 (e.g., the concatenated source-channel encoder 306 collectively) generates the multicast codeword X in which the scheduled descriptions $\{d_u\}$ are encoded and transmits the multicast codeword to the receiver in response to the received request. In particular, the outer channel encoder 310 generates channel codewords of length n, while the inner source encoder 308 generates the final multicast codeword X of length $\Delta$, by concatenating linear combinations of n-length channel codewords.

As shown in FIG. 3, for example, the concatenated source-channel encoder 306 takes $\{d_u\}$ as input and generates a multicast codeword of length $d_u B\psi(f,M)/\eta_u$. Hence, the dependence of $\psi(f,M)$ on the demand realization f is important and may entail possible updates of the channel codebook at each request. In order to eliminate or at least mitigate this overhead, the multicast codeword length may be set, as an average, to be equal to the video segment playback duration $\Delta$ while maintaining that receiver u obtains $d_u$ descriptions at an average channel rate $\eta_u/E[\psi(f,M)]$. In this case, the number of scheduled descriptions (in step 404) for receiver u may be implemented as:

$$d_u = \frac{\Delta \eta_u}{BE[\psi(f, M)]},$$

where $E[\psi(f,M)]$ is the expectation of $\psi(f,M)$ taken over the random request vector f and random cache configuration given by:

$E[\psi(f,M)] = \min\{\phi(p,Q), \overline{m}\}$ and where:

$$\overline{m} = \sum_{f=1}^{m} (1 - (1 - q_f)^U),$$

$$\phi(p, Q) = \sum_{f=1}^{m} \sum_{\ell=1}^{U} U_\ell \rho_{f,\ell}(1 - p_f M)^{U-\ell+1}(p_f M)^{\ell-1},$$

$$\rho_{f,\ell}\left(f = \underset{j \in Y}{\operatorname{argmax}} (p_j M)^{\ell-1}(1 - p_j M)^{n-\ell+1}\right);$$

in which Y denotes a random set of l elements selected in an i.i.d. manner from the set of files (with replacement).

More particularly, the outer channel encoder 308 illustrated in FIG. 3 takes as input the GISs generated by the channel-aware source compressor 306 and, for each GIS and receiver u, encodes the descriptions associated with the set $P_u$ of entropy $|P_u|B$ bits, into channel codewords $\mathcal{C}_u(P_u)$ of length n, via channel codebook $\mathcal{C}_u$, generated according to the definition where an $(2^{m_u}, n)$ channel code for the u-th binary channel consists of an index set $\{1, 2, \ldots, 2^{m_u}\}$, and an encoding function $\mathcal{C}_u : \{1, 2, \ldots, 2^{m_u}\} \to \{0, 1\}^n$, which yields the channel codebook $\{\mathcal{C}_u(1), \ldots \mathcal{C}_u(2^{m_u})\}$.

The decoding function being expressed as $g_u : Y^n \to \{1, 2, \ldots, 2^{m_u}\}$. Note that if $$\frac{|P_u|}{\eta_u} B$$

is not a multiple of n, then zero-padding may be applied to the $|P_u|B$ bits.

The network element 151 notifies the computed codebooks to each receiver 200 at network setup or anytime channel conditions change. Hence, each receiver 200 is aware, not only of its own codebook, but also of the codebooks of the other receivers 200.

In order to ensure that receiver "u" obtains $d_u$ descriptions at a channel rate $\eta_u/\psi(f,M)$, the channel codeword length is set to $$n = \frac{\Delta}{\psi(f, M)}$$

as noted above. As also noted above, the fact that n depends on the demand realization implies that the channel codebook may need to be updated and notified to each receiver 200 at each request round, which may lead to significant overhead. In order to eliminate or mitigate this overhead, the channel codeword length is set to $$n = \frac{\Delta}{E[\psi(f, M)]},$$

which, as noted earlier, is equivalent to set the time-slot duration to be equal to the video segment playback duration in average, and to set the average channel rate at which receiver "u" obtains $d_u$ descriptions to $\eta_u/E[\psi(f,M)]$.

The inner source encoder 310 generates the combined final multicast codeword X by XORing the channel codewords $\{\mathcal{C}_u(P_u)\}$ belonging to the same GIS, and concatenating the resulting codewords of length n. Since the number of the GISs produced by the channel-aware source compressor 304 is given by $\chi_{CA}$, X is obtained by concatenating $\chi_{CA}$ codewords of length n, resulting in a multicast codeword of average length $\Delta$.

Having described the operational steps above, two algorithmic embodiments of the channel-aware source compressor are described now. Each of the two embodiments build on generalizations of existing caching-aided coded multicast schemes to the case of noisy broadcast channels. Specifically, the first embodiment is referenced herein as the CA-CIC as the channel aware extension of the chromatic index coding scheme, and the second embodiment, referenced herein as the CA-HgC as the channel-aware extension of the polynomial-time hierarchical greedy coloring algorithm.

Channel-Aware Chromatic Index Coding (CA-CIC)

It is noted that finding a coded multicast scheme for the broadcast caching network is equivalent to finding an index code with side information given by the cache realization. A well-known index code is given by the chromatic number of the conflict graph, constructed according to the demand and cache realizations. Given the cache realization, a file-level demand realization (given by the request vector f) can be translated into a packet-level request vector containing the missing packets at each receiver. A request for file $f_u$ by receiver u (step 402) may thus be considered equivalent to requesting $D - |M_{u,f}|$ packets corresponding to all missing (i.e., uncached) packets of the highest quality level of video segment $f_u$. However, based on the channel degradations, the sender schedules a subset of the missing packets $d_u \in \{1, \ldots, D(1-M_{u,f})\}$, above (step 404). Denoting as W the scheduled random packet-level configuration and by $W_{u,f}$ the set of packets of file f scheduled for receiver u, the corresponding index coding conflict graph $\mathcal{H}_{M,W} = (V,E)$ may be defined and constructed as where 1) Each vertex $v \in V$ represents a scheduled packet, uniquely identified by the pair $\{\rho(v)\mu(v)\}$, where $\rho(v)$ indicates the packet identity associated to vertex v and $\mu(v)$ represents the receiver for whom it is scheduled. In total, we have $|V| = \Sigma_{u \in U} d_u$ vertices. And, 2) For any pair of vertices $v_1, v_2$, it can be understood that vertex $v_1$ interferes with vertex $v_2$ if the packet associated to the vertex $v_1$, $\rho(v_1)$, is not in the cache of the receiver associated to vertex $v_2$, $\mu(v_2)$, and $\rho(v_1)$ and $\rho(v_2)$ do not represent the same packet. Then, there is an edge between $v_1$ and $v_2$ in E if $v_1$ interferes with $v_2$ or $v_2$ interferes with $v_1$.

In the constructed graph $\mathcal{H}_{M,W}$, the set of vertices scheduled for the same receiver, i.e., the set of vertices $v \in$ such that $\mu(v) = u$, is fully-connected. Based on this consideration, $\mathcal{H}_{M,W}$ is referenced herein as a U-clustered graph.

Thus, in the present disclosure, the generalized independent sets determined in step 406 may be determined as $(s_1, \ldots, s_U)$-GIS from a U-clustered graph $\mathcal{A}_{M,W}$ as an ordered set of U fully connected sub-graphs $\{P_1, \ldots P_U\}$ such that for all $u = 1, \ldots, U$, and all $v \in P_u$, $\mu(v) = u$ (i.e., all the packets in $P_u$ are scheduled for receiver u); $|P_u| = s_u \geq 0$ (i.e., the number of packets in $P_u$ is equal to $s_u$); and for all $i \neq u$, $P_u$ and $P_i$ are mutually disconnected (i.e., no edges exist between any two subgraphs). Note that when $s_u \leq 1$, $\forall u \in U$, the generalized information set $(s_1, \ldots, s_U)$-GIS become the classical definition of independent set.

Based on the definition of the GIS above, a further definition of channel-aware valid coloring and channel-aware chromatic number of the conflict graph are introduced as follows. First, a $(\eta_1, \ldots, \eta_U)$-channel-aware valid vertex-coloring is obtained in step 406 by covering the conflict graph $\mathcal{H}_{M,W}$ with $(s_1, \ldots, s_U)$-GISs that further satisfy $$\frac{s_u}{s_i} = \frac{\eta_u}{\eta_i}, \forall u, i \in \{1, \ldots U\},$$

and assigning the same color to all the vertices in the same GIS, referenced herein as Channel-Aware Valid Vertex-Coloring.

Secondly, The $(\eta_1, \ldots, \eta_U)$ channel-aware chromatic number of a graph H is defined as $$\chi_{CA}(\mathcal{H}_{M,W}) = \min_{c \in C} \phi(c)$$

where C denotes the set of all $(\eta_1, \ldots, \eta_U)$ channel-aware valid vertex-coloring of $\mathcal{H}_{M,W}$, and $\phi(c)$ is the total number of colors in $\mathcal{H}_{M,W}$ for the given $(\eta_1, \ldots, \eta_U)$ channel-aware valid vertex-coloring $\phi$, referenced herein as the Channel-aware Chromatic Number.

It can thus be shown that for a given conflict graph $\mathcal{H}_{M,W}$ constructed according to cache realization, demand realization M, scheduled descriptions $$\left\{d_u = \frac{\Delta \eta_u}{B\psi(,)}\right\},$$

and scheduled random packet-level configuration W, a tight upper-bound for the the channel-aware chromatic number $\chi_{CA}(H_{M,W})$, when the number of descriptions D→∞, is given by: $\chi_{CA}(H_{M,W})=\psi(f,M)+o(D)$.

Thus, the GISs associated to the chromatic number $\chi_{CA}(\mathcal{H}_{M,W})$ are then used by the concatenated source-channel encoder 306 to generate the final multicast codeword X (step 408).

As a concrete example, consider a network with U=3 receivers, denoted as U={1, 2, 3} and m=3 files denoted as F={$\mathcal{A}$, $\mathcal{B}$, C}. It is assumed that the channel rates are equal to $\eta_1$=½, $\eta_2$=¼, $\eta_3$=¼, and Δ=8 time-units. It is also assumed that demand and caching distributions are such that [ψ(,)]=2. Furthermore, as described above, each file is multiple description coded into D descriptions, e.g., $\mathcal{A}$={$\mathcal{A}_1$, $\mathcal{A}_2$, ..., $\mathcal{A}_D$}, each of length B=F/D=1 bits.

Figure 5:
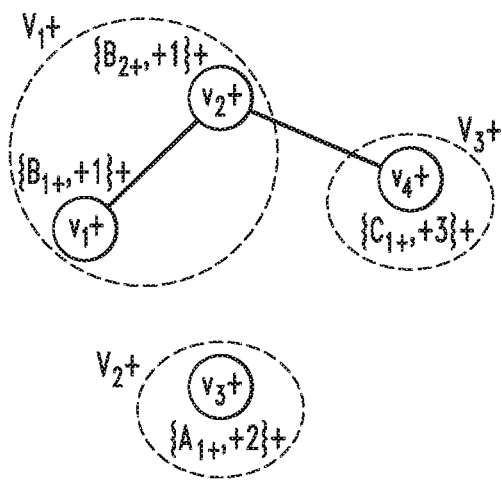
FIG. 5 illustrates an example of a U-clustered conflict graph $\mathcal{H}_{M,W}$ for three receivers.

In the example above, the sender is configured to schedules 2 descriptions for receiver 1, i.e., $d_1$=2, and one description for receivers 2 and 3, i.e., $d_2$=$d_3$=1. It may be assumed further that the caching realization is given by: $M_{1,A}$={$\mathcal{A}_1$, $\mathcal{A}_2$}, $M_{1,C}$={$C_1$}; $M_{2,B}$={$\mathcal{B}_1$, $\mathcal{B}_2$}, $M_{2,C}$={$C_1$}; $M_{3,A}$={$\mathcal{A}_1$}, $M_{3,B}$={$\mathcal{B}_1$, $\mathcal{B}_3$}. Suppose that receiver 1 requests $\mathcal{B}$, receiver 2 requests $\mathcal{A}$ and receiver 3 requests C such that $M_{1,B}$={$\mathcal{B}_1$, $\mathcal{B}_2$}, $M_{2,A}$={$\mathcal{A}_1$} and $M_{3,C}$={$C_1$}. The corresponding U-clustered conflict graph H, that may be generated by the channel-aware source compressor 304 is shown in FIG. 5, along with the U-clusters $\{_u\}_{u=1}^3$. Each vertex v in $\mathcal{H}_{M,W}$ illustrated in FIG. 5 is uniquely identified by the pair {ρ(v), μ(v)} with ρ(v) indicating the packet identity and μ(v) the requesting receiver.

Figure 6:
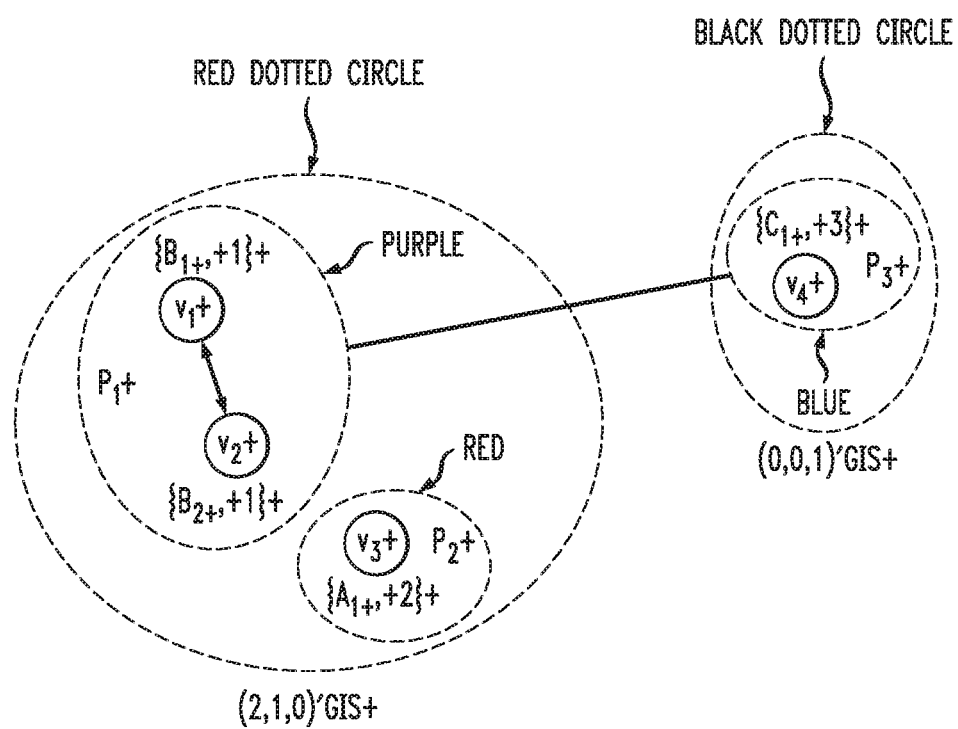
FIG. 6 illustrates an example of an $(s_1, s_2, s_3)$-GISs determined based on the 3-clustered graph $\mathcal{H}_{M,W}$ shown in FIG. 5.

Continuing the example, FIG. 6, illustrates ($s_1$, $s_2$, $s_3$)-GISs covering the 3-clustered graph $\mathcal{H}_{M,W}$. The first GIS is composed of two nonempty fully connected sub-graphs: $P_1$={$v_1$, $v_2$} with $s_1$=|$P_1$|=2, and $P_2$={$v_3$} with $s_2$=|$P_2$|=1. The second GIS is composed of one non-empty fully connected subgraph: $P_3$={$v_4$}, with $s_3$=|$P_3$|=1.

The channel-aware vertex coloring is also depicted in FIG. 6, with channel-aware chromatic number $\chi_{CA}(\mathcal{H}_{M,W})$ equal to two colors, one for each GIS (red dotted circle and black dotted circle). The multicast codeword of length Δ=8 is obtained concatenating the codewords $\mathcal{C}_1(P_1) \oplus \mathcal{C}_2(P_2)$ and $\mathcal{C}_3(P_3)$, each of length n=4.

Channel-Aware Hierarchical Greedy Coloring (CA-HgC)

In view of the exponential complexity of CA-CIC embodiment described above, an alternative embodiment referenced as Channel-Aware Hierarchical greedy Coloring (CA-HgC) is provided, which is a coded multicast algorithm that fully accounts for the broadcast channel impairments, while exhibiting polynomial-time complexity. The CA-HgC algorithm discussed below may be implemented in the channel-aware source compressor 304.

The CA-HgC algorithm works by computing two valid colorings of the conflict graph $\mathcal{H}_{M,W}$, referred to as CA-$HgC_1$ and CA-$HgC_2$. CA-HgC then compares the corresponding number of colors achieved by the two solutions and selects the coloring with minimum number of colors. It is noted that CA-$HgC_1$ coincides with the conventional naive (uncoded) multicast scheme. In fact, CA-$HgC_1$ computes the minimum coloring of $\mathcal{H}_{M,W}$ subject to the constraint that only the vertices representing the same packet are allowed to have the same color. In this case, the total number of colors is equal to the number of distinct requested packets, and the coloring can be found in O(|V|$^2$). On the other hand, CA-$HgC_2$ is described by the algorithm illustrated in FIG. 7, in which the subroutine GISfunction (•,•,•) is defined by the algorithm illustrated in FIG. 8. It can be shown that the complexity of CA-$HgC_2$ is given by O(U|V|$^2$), i.e., it is polynomial in |V|.

In the following, a walk-through of Algorithm of FIG. 7 is provided, followed by a concrete example. With a slight abuse of notation, $c_u = \mathcal{C}_u(\{v' \in \mathcal{G} : \mu(v')=u\})$ denotes the codeword obtained by coding the $Bs_u$ source bits associated to the packets {ρ(v'):μ(v')=u}.

Let $K_v = \{u \in U : \rho(v) \in W_u \cup M_u\}$ denote the set of receivers that request and/or cache packet ρ(v). The i-th vertex hierarchy of $\mathcal{H}_{M,W}$ is initialized to the set of vertices for whom the number of receivers requesting and/or caching its packet identity is equal to i, i.e., $\mathcal{H}_i = \{v : |K_v|=i\}$. CA-$HgC_2$ proceeds in decreasing order of hierarchy starting from the U-th hierarchy.

The subroutine GISfunction ($\mathcal{H}_i$, v, i) is called for each vertex v in the i-th hierarchy in increasing order of cardinality |$K_v$|. If the subroutine returns a non-empty set $\mathcal{G}$, then the vertices in $\mathcal{G}$ are colored with the same color (lines 6-10). Otherwise, the uncolored vertex v is moved to the next hierarchy, i.e., $\mathcal{H}_{i-1}$ (lines 11-12). This procedure is iteratively applied for any hierarchy, until all the vertices in the conflict graph $\mathcal{H}_{M,W}$ are colored. The procedure returns the number of colors, |c|, as well as the set of codewords X.

Regarding the subroutine GISfunction ($H_i$, v, i) shown in FIG. 8, initially the set $\mathcal{G}$={v}. Then, for each vertex v'∈$\mathcal{H}_i$ in increasing order of cardinality |$K_{v'}$|, v' is moved into $\mathcal{G}$ if v' is not connected (via the conflict graph) to any node currently in $\mathcal{G}$ (lines 2-8). Note that in the first iteration the lowest cardinality in $\mathcal{H}_i$ is exactly equal to i. By construction, each vertex in the conflict graph has an associated receiver, hence Ω denotes the set of receivers associated to the vertices in $\mathcal{G}$. If $\mathcal{G}$ <i, i.e., if at least i vertices were not selected, then the algorithm returns two empty sets (lines 23-25). Otherwise, the algorithm proceeds by trying to select, for each receiver μ(v')∈Ω, $d_{\mu(v')}$-1 additional lowest-cardinality vertices in $\mathcal{H}_i$ having no links with the vertices in $\mathcal{G}$ associated to receivers different from μ(v') (lines 10-17). If the algorithm succeeds (or if the considered hierarchy is 1, meaning that there are no further hierarchies to explore), then the algorithm returns the set of selected vertices $\mathcal{G}$ as well as the set of associated receivers Ω (lines 18-20). Otherwise, the algorithm returns two empty sets (lines 21-22).

As a concrete example, consider the same conflict graph $\mathcal{H}_{M,W}$ shown in FIG. 5, to which the algorithm of FIG. 7 is applied. The algorithm begins by constructing $K_v$ by inspection of the conflict graph: $K_{v_1}$={1, 2, 3}, $K_{v_2}$={1, 2}, $K_{v_3}$={1, 2, 3}, and $K_{v_4}$={1, 2, 3}. Hence $\mathcal{H}_U = \mathcal{H}_3$={$v_1$, $v_3$, $v_4$}, $\mathcal{H}_2$={$v_2$} and $\mathcal{H}_1$=∅. Starting from the highest hierarchy, in line 5 the subroutine GISfunction is called with parameters $\mathcal{H}_3$, $v_1$ and 3. By running iteratively the proposed algorithm, the GISs shown in FIG. 6 are obtained.

In this section, the decodability of the multicast codewords transmitted by the sender to the receivers is described. From the observation of its channel output $Y_u$, representing its noisy version of the transmitted codeword X, each receiver is able to decode the $d_u$ descriptions of its requested video segment, $W_u \in \mathcal{F}$ scheduled and transmitted by the sender as $\hat{W}_u = \lambda_u(Y_u, Z_u, f)$, via its own decoding function $\lambda_u$, which consists of two stages.

First, the noisy version of the codeword $\mathcal{C}_u(j)$ is obtained by performing the inverse of the XOR-function. This processing can be conducted since, by design, the codewords of different receivers belonging to the same GISs do not interfere with each other (i.e., they can be generated from the cached information of receiver u). In fact, receiver u is informed by the sender of: i) all the U codebooks; ii) the packets from its cache that are present in the received XORed codeword, along with the corresponding codebooks used to construct the codeword.

Secondly, the recovered noisy codeword $\mathcal{C}_u(j)$ is sent to the channel decoder of receiver u, which reconstructs the bits associated to the set $P_u$ according to the channel rate $\eta_u$. Hence, in the limit D→∞, the proposed sequence of $(\Delta, \{\in_u\})$-delivery schemes is admissible as defined below.

Each receiver $u \in U$, after observing its channel output $Y_u$, decodes the requested file $W_{f_u}$ as $\hat{W}_{f_u} = \lambda_u(Y_u, Z_u, f)$, where $\lambda_u$ denotes the decoding function of receiver u (with $Y_u$ denoting the set of the received sequence at user u). The worst-case (over the library) probability of error of a $(\Delta, \{\in_u\})$-delivery scheme over a stochastically degraded broadcast channel with channel degradations $0 \leq \in_1 \leq \in_2 \leq \ldots \leq \in_U \leq 1$ is defined as $$P_e^{(F)}(X, \{Z_u\}, \{\lambda_u\}, \{\varepsilon_u\}) = \sup_{\{W_f\}}\left(\bigcup_{u \in U}\{\hat{W}_{f_u} \neq W_{f_u}\}\right).$$

Thus, a sequence of $(\Delta, \{\in_u\})$-delivery schemes is called admissible if:

$$\lim_{F \to \infty} P_e^{(F)}(X, \{Z_u\}, \{\lambda_u\}, \{\varepsilon_u\}) = 0.$$

It is noted that the variable-to-fixed nature of the multicast encoder is due to the fact that, while the length of the transmitted codeword X is fixed to the time-slot duration $\Delta$, given by the video segment playback duration, the amount of information bits transmitted by the encoder is variable and given by $\Sigma_u d_u B$.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A network element for a wireless Content Delivery Network, comprising:
a processor configured to:
receive a request from receiver devices for a video segment over the wireless CDN;
compute a number of descriptors of the video segment scheduled to be delivered to each of the receiver devices for the requested video segment, the number of descriptors being determined based on channel conditions between the network element and the each of the receiver devices and further based on video content previously cached at each of the receiver devices;
cluster a set of descriptors for each of the receiver devices into a minimum number of Generalized Independent Sets (GISs) based on the computed number of descriptors, the channel conditions between the network element and each of the receiver devices, and the video content previously cached at each of the receiver devices;
generate channel codewords encoding the clustered descriptors for each of the receiver devices using the minimum number of GISs and based on the channel conditions;
generate a multicast codeword from the generated channel codewords for transmission to the receiver devices; and,
transmit the multicast codeword to each of the receiver devices in response to the received request in order to allow each of the receiver devices to decode the multicast codeword into the requested video segment.

2. The network element of claim 1, wherein the processor is further configured to:
determine the clustered set of descriptors scheduled for each of the receiver devices and the minimum number of Generalized Independent Sets (GISs) based on cached content at each of the receiver devices.

3. The network element of claim 1, wherein the processor is further configured to:
generate the multicast codeword such that each of the receiver devices is enabled to decode its requested video segment at a rate that is equal to the maximum rate achievable based on the channel conditions.

4. The network element of claim 3, wherein the processor is further configured to:
generate the multicast codeword as a fixed length codeword.

5. The network element of claim 3, wherein the processor is further configured to:
cluster the set of descriptors scheduled for each of the receiver devices into a minimum number of Generalized Independent Sets (GISs) such that a plurality of scheduled descriptors in a GIS scheduled for different ones of the receiver devices can be transmitted in a same time-frequency slot without affecting decodability of the multicast codeword at the receiver devices.

6. The network element of claim 1, wherein the processor is further configure to:
determine the minimum number of Generalized Independent Sets (GIS s) as a determined channel-aware chromatic-number of GISs that cover a conflict graph.

7. The network element of claim 1, wherein the processor if further configured to:
encode the clustered descriptors scheduled for each of the receiver devices into fixed-length channel codewords for each of the receiver devices based on channel conditions between the network element and each of the receiver devices and to combine the fixed-length channel codewords into the multicast codeword.

8. The network element of claim 7, wherein the processor is further configured to determine the fixed-length channel codewords for each of the receiver devices using a channel codebook that is determined based on the channel conditions between the network element and each of the receiver devices.

9. The network element of claim 8, wherein the processor is further configured to:
transmit the channel codebook to each of the receiver devices.

10. The network element of claim 1, wherein the processor is further configured to:
generate the multicast codeword encoding the clustered descriptors for each of the receiver devices using the minimum number of GISs and a Channel-Aware Chromatic Index Coding (CA-CIC) algorithm.

11. The network element of claim 1, wherein the processor is further configured to:
generate the multicast codeword encoding the clustered descriptors for each of the receiver devices using the minimum number of GISs and a Channel-Aware Hierarchical greedy Coloring (CA-HgC) algorithm.

12. A computer-implemented method for transmitting data from a network element interconnected with a plurality of receiver devices via a wireless Content Delivery Network (CDN), the method comprising:
receiving a request from the plurality of receiver devices for a data segment over the wireless CDN;
computing a number of descriptors of the data segment scheduled to be delivered to each of the plurality of receiver devices for the requested data segment, the number of descriptors being determined for each of the plurality of receiver devices based on channel conditions between the network element and the plurality of receiver devices;
cluster a set of descriptors for each of the plurality of receiver devices into a minimum number of Generalized Independent Sets (GISs) based on the computed number of descriptors and the channel conditions between the network element and each of the plurality of receiver devices;
generate channel codewords encoding the clustered descriptors for each of the plurality of receiver devices using the minimum number of GISs and based on the channel conditions;
generate a multicast codeword from the generated channel codewords for transmission to each of the plurality of receiver devices; and
transmit the multicast codeword to each of the plurality of receiver devices in response to the received request in order to allow each of the plurality of receiver devices to decode the multicast codeword into the requested data segment.

13. The computer-implemented method of claim 12, further comprising:
determining the clustered set of descriptors scheduled for each of the plurality of receiver devices and the minimum number of Generalized Independent Sets (GISs) based on cached content at each of the plurality of receiver devices.

14. The computer-implemented method of claim 12, further comprising:
generating the multicast codeword such that each of the plurality of receiver devices is enabled to decode its requested data segment at a rate that is equal to the maximum rate achievable based on the channel conditions.

15. The computer-implemented method of claim 12, further comprising:
clustering the set of descriptors scheduled for each of the plurality of receiver devices into a minimum number of Generalized Independent Sets (GISs) such that a plurality of scheduled descriptors in a GIS scheduled for different ones of the plurality of receiver devices can be transmitted in a same time-frequency slot without affecting decodability of the multicast codeword at the plurality of receiver devices.

16. The computer-implemented method of claim 12, further comprising:
determining the minimum number of Generalized Independent Sets (GISs) as a determined channel-aware chromatic-number of GISs that cover a conflict graph.

17. The computer-implemented method of claim 12, further comprising:
encoding the clustered descriptors scheduled for each of the plurality of receiver devices into fixed-length channel codewords for each of the plurality of receiver devices based on channel conditions between the network element and each of the plurality of receiver devices and combining the fixed-length channel codewords into the multicast codeword.

18. The computer-implemented method of claim 17, further comprising:
determining the fixed-length channel codewords for each of the plurality of receiver devices using a channel codebook that is determined based on the channel conditions between the network element and each of the plurality of receiver devices.

19. The computer-implemented method of claim 12, further comprising:
generating the multicast codeword encoding the clustered descriptors for each of the plurality of receiver devices using the minimum number of GISs and a Channel-Aware Chromatic Index Coding (CA-CIC) algorithm.

20. The computer-implemented method of claim 12, further comprising:
generating the multicast codeword encoding the clustered descriptors for each of the plurality of receiver devices using the minimum number of GISs and a Channel-Aware Hierarchical greedy Coloring (CA-HgC) algorithm.

* * * * *